United States Patent
Moon et al.

(10) Patent No.: US 7,916,207 B2
(45) Date of Patent: Mar. 29, 2011

(54) APPARATUS AND METHOD FOR GENERATING FOCUS DATA IN AN IMAGE SENSOR

(76) Inventors: Ji-Hye Moon, Chungcheongbuk-do (KR); Jang-Sik Moon, Chungcheongbuk-do (KR); Jeong-Guk Lee, Chungcheongbuk-do (KR)

(*) Notice: Subject to any disclaimer, the term of this patent is extended or adjusted under 35 U.S.C. 154(b) by 750 days.

(21) Appl. No.: 11/319,554

(22) Filed: Dec. 29, 2005

(65) Prior Publication Data

US 2006/0146151 A1    Jul. 6, 2006

(30) Foreign Application Priority Data

Dec. 30, 2004 (KR) .................. 10-2004-0115989

(51) Int. Cl.
*H04N 5/232* (2006.01)
(52) U.S. Cl. ..... 348/349; 348/353; 348/354; 348/222.1; 348/246; 382/263
(58) Field of Classification Search .......... 348/349
See application file for complete search history.

(56) References Cited

U.S. PATENT DOCUMENTS

| | | | | |
|---|---|---|---|---|
| 5,832,143 | A * | 11/1998 | Suga et al. | 382/300 |
| 6,636,630 | B1 * | 10/2003 | Adachi et al. | 382/176 |
| 6,683,643 | B1 * | 1/2004 | Takayama et al. | 348/247 |
| 7,110,612 | B1 * | 9/2006 | Wang | 382/262 |
| 7,253,836 | B1 * | 8/2007 | Suzuki et al. | 348/234 |
| 2003/0136907 | A1 * | 7/2003 | Takane et al. | 250/310 |
| 2003/0218677 | A1 * | 11/2003 | Nishimura | 348/223.1 |
| 2003/0218679 | A1 * | 11/2003 | Castorina et al. | 348/272 |
| 2004/0032516 | A1 * | 2/2004 | Kakarala | 348/246 |

FOREIGN PATENT DOCUMENTS

KR    1999-81799    11/1999

* cited by examiner

*Primary Examiner* — Sinh Tran
*Assistant Examiner* — Paul Berardesca
(74) *Attorney, Agent, or Firm* — McAndrews, Held & Malloy, Ltd.

(57) ABSTRACT

An apparatus for generating a focus data in an image sensor, the apparatus includes a green interpolation unit for generating a M×N green plane from the RGB bayer pattern of a predetermined selected image window through a green interpolation; and a focus data generation unit for extracting the focus data from the M×N green plane, wherein M and N are positive integers.

12 Claims, 4 Drawing Sheets

APPARATUS AND METHOD FOR GENERATING FOCUS DATA IN AN IMAGE SENSOR

The present application contains subject matter related to the Korean patent application No. KR 2004-115989, filed in the Korean Patent Office on Dec. 30, 2004, the entire contents of which being incorporated herein by reference.

FIELD OF THE INVENTION

The present invention relates to an auto focus control of an image sensor; and, more particularly, to an apparatus for generating a focus data in an image sensor having an RGB bayer color pattern by using only green information, and a method for generating the same.

DESCRIPTION OF RELATED ARTS

Recently, a complementary metal oxide semiconductor (CMOS) image sensor has been widely used for a device such as a mobile phone, a camera for a personal computer, an electronic device or the like. The CMOS image sensor has several advantageous merits that its driving method is simple in comparison with a charge coupled device (CCD), which has been used for the image sensor, and a signal processing circuit can be integrated in one chip so as to enable a module to be more and more micronized in virtue of a system on chip (SOC).

In addition, since a CMOS technology, which has been set up already, can be utilized compatibly in fabricating the CMOS image sensor, there is another merit that it is possible to reduce manufacturing cost.

Meanwhile, in a modern image sensor system, an auto focus control function becomes an essential function of the image sensor. Therefore, it becomes a criterion to determine the function of the image sensor how sharply the focus is adjusted under various environments. Accordingly, there have been increased image sensor systems having the auto focus control function.

FIG. 1 is a block diagram setting forth a conventional apparatus for generating a focus data in an image sensor.

Referring to FIG. 1, the conventional apparatus for generating the focus data, includes an RGB interpolation unit 100 for performing an RGB interpolation using an RGB bayer pattern, a color space converter 101 for performing a color space conversion for extracting a luminance component of 'Y' value using the interpolated RGB data, and a focus data generation unit 102 for generating the focus data using the 'Y' value extracted through the color space conversion.

In the conventional apparatus for generating the focus data having the above constitution, the focus data is generated by extracting the 'Y' luminance value from an RGB domain, after interpolating the bayer pattern to have the RGB data at every pixel through the RGB interpolation unit 100. In this case, the conventional apparatus requires the interpolation unit 100 to generate the focus data and the color space converter 101 to extract the 'Y' value.

Therefore, blocks for the interpolation and the color spacer conversion should be additionally installed in the conventional apparatus for generating the focus data so that a hardware resource is additionally needed, which leads to increase power consumption after all.

SUMMARY OF THE INVENTION

It is, therefore, an object of the present invention to provide an apparatus for generating a focus data in an image sensor capable of preventing hardware resources and power consumption from being increased when extracting the focus data, and a method for generating the same.

In accordance with an aspect of the present invention, there is provided an apparatus for generating a focus data in an image sensor, the apparatus including: a green interpolation unit for generating a M×N green plane from the RGB bayer pattern of a predetermined selected image window through a green interpolation; and a focus data generation unit for extracting the focus data from the M×N green plane, wherein M and N are positive integers.

In accordance with another aspect of the present invention, there is provided a method for generating a focus data in an image sensor, the method including: selecting an image window for obtaining a focus data from an RGB bayer pattern; performing a green interpolation for generating an M×N green plane using the RGB bayer pattern in the selected window; and extracting a focus data from the M×N green plane if the bad pixel does not exist, wherein M and N are positive integers.

BRIEF DESCRIPTION OF THE DRAWINGS

The above and other objects and features of the present invention will become better understood with respect to the following description of the preferred embodiments given in conjunction with the accompanying drawings, in which.

DETAILED DESCRIPTION OF THE INVENTION

An apparatus for generating a focus data in an image sensor and a method for generating the same in accordance with exemplary embodiments of the present invention will be described in detail with reference to the accompanying drawings.

Figure 1:
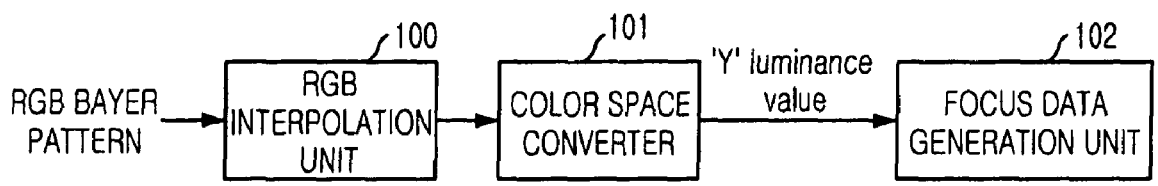
FIG. 1 is a block diagram setting forth a conventional apparatus for generating a focus data in an image sensor.
Figure 2:
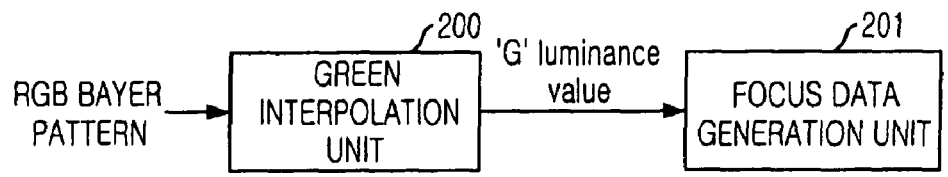
FIG. 2 is a block diagram setting forth an apparatus for generating a focus data in an image sensor in accordance with an embodiment of the present invention.

FIG. 2 is a block diagram setting forth an apparatus for generating a focus data in an image sensor in accordance with an embodiment of the present invention.

Referring to FIG. 2, the apparatus for generating the focus data in accordance with the present invention includes a green interpolation unit 200 and a focus data generation unit 201. The green interpolation unit 200 selects a window for obtaining a focus data from an RGB bayer pattern, and generates an M×N green plane (M and N are positive integers) from the bayer pattern for using the focus data in the selected window. The focus data generation unit 201 extracts the focus data by extracting a boundary value with a high frequency component from the M×N green plane.

Figure 3:
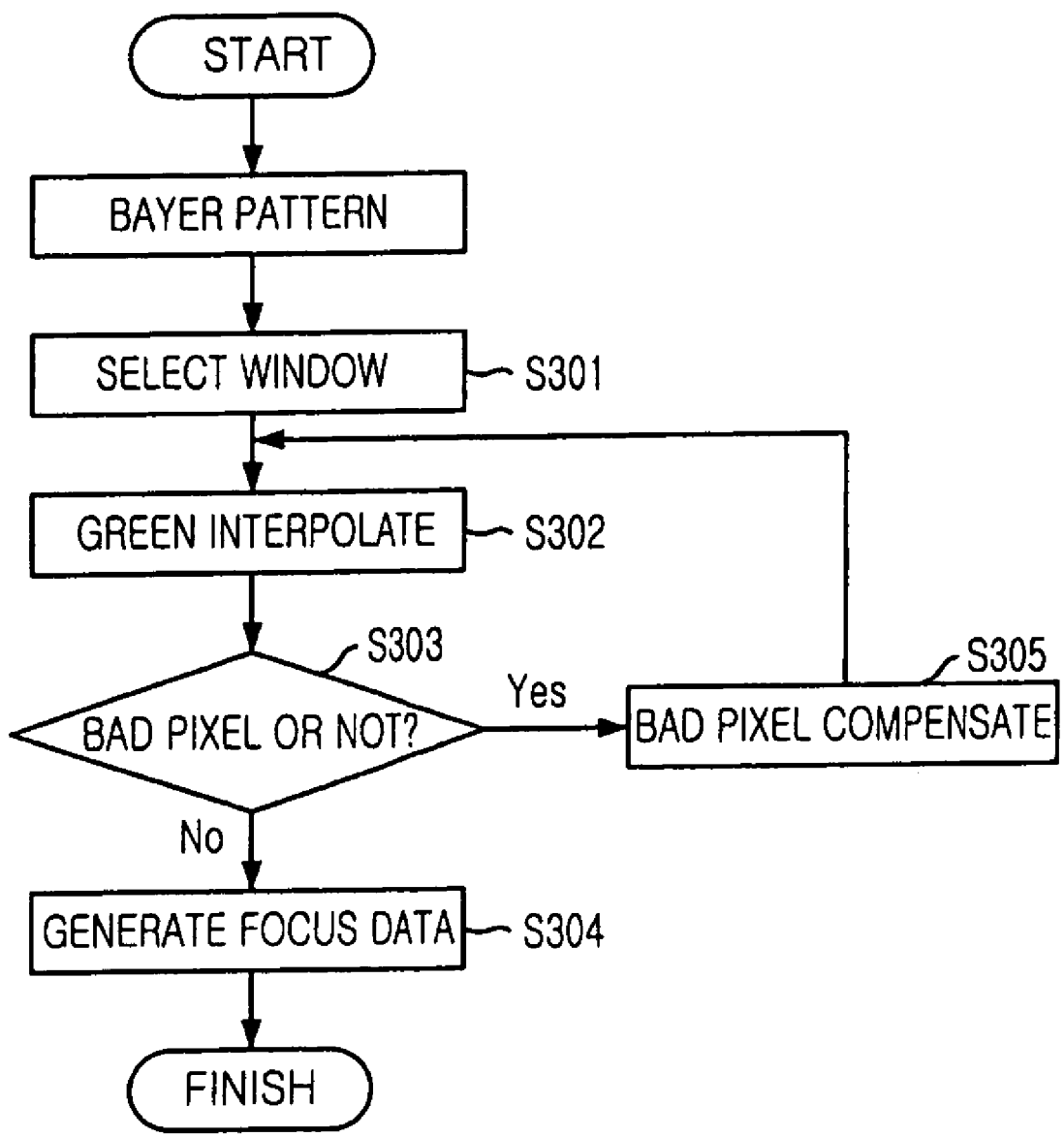
FIG. 3 is a flow chart setting forth a procedure for generating the focus data of the image sensor in accordance with an embodiment of the present invention.

FIG. 3 is a flow chart setting forth a procedure for generating the focus data of the image sensor in accordance with an embodiment of the present invention.

The procedure for generating the focus data will be described in detail with reference to FIGS. 2 and 3, herebelow.

First, after selecting the window for generating the focus data from the RGB bayer pattern (S301), an interpolation is performed using information about a peripheral green pixel at the RGB bayer pattern in the selected window (S302).

At this time, the M×N green plane may be obtained from an (M+1)×(N+1) bayer pattern and also may be obtained from an M×N bayer pattern.

Figure 4:
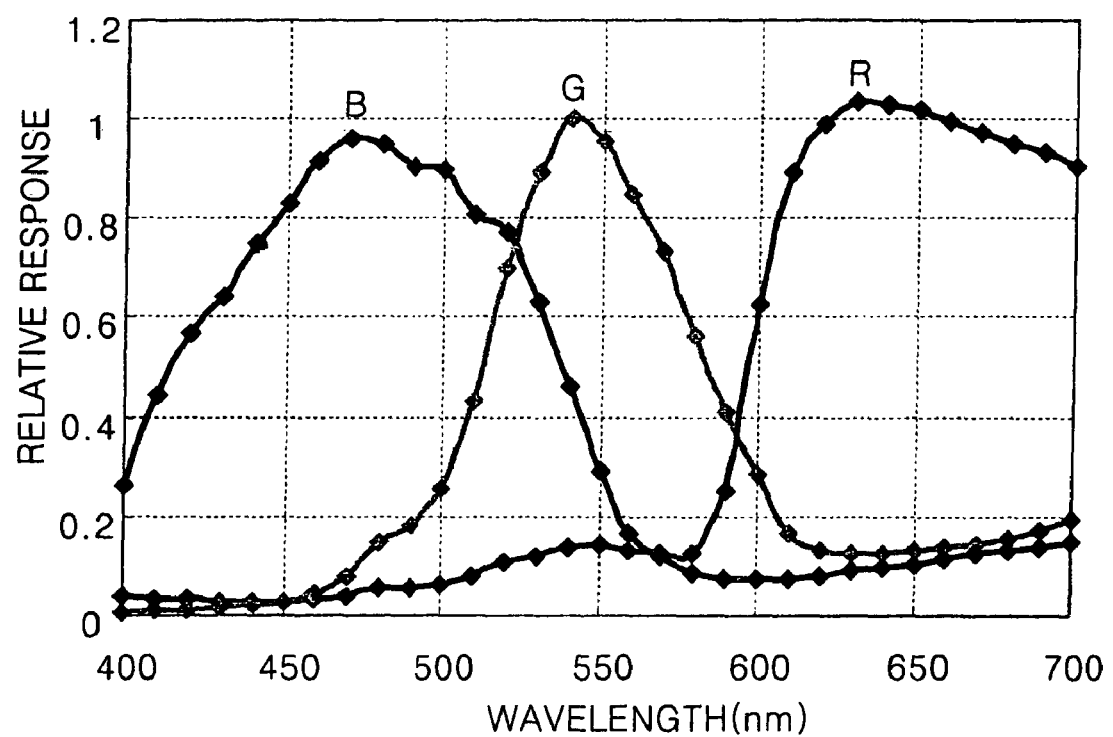
FIG. 4 is a graph showing spectral characteristic of red (R), green (G), and blue (B)

FIG. 4 is a graph showing spectral characteristic of red (R), green (G), and blue (B).

In detail, FIG. 4 shows relative response versus wavelength of RGB. It is understood that the green (G) has information with regard to both red (R) and blue (B) because it has a medium wavelength band between red (R) and blue (B).

A following mathematic equation 1 represents luminance value extracted from an RGB domain.

$$Y = 0.299 \times R + 0.587 \times G + 0.114 \times B \quad [\text{Eq. 1}]$$

From the above equation 1, it is understood that a weight for green information is relatively high compared to red or blue. Therefore, in the present invention, it is possible to generate the accurate focus data using only the green information without an additional process for extracting a luminance component, which will be set forth more fully later.

Figure 5:
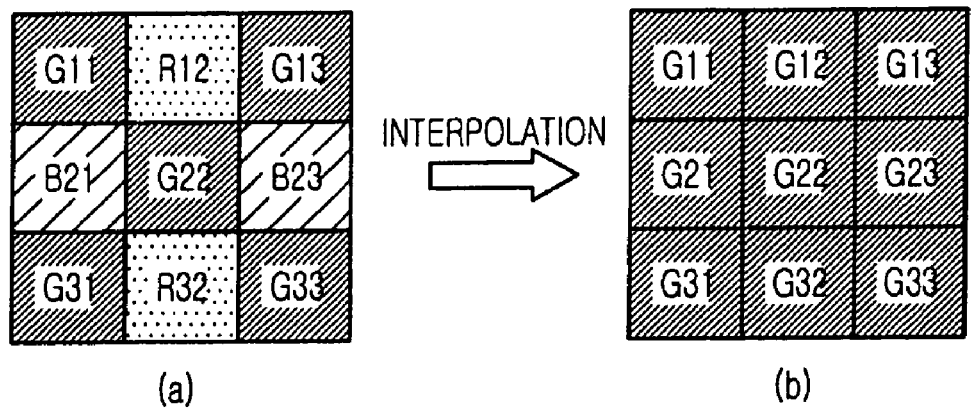
FIG. 5 is a drawing illustrating a green interpolation.

FIG. 5 is a drawing illustrating a green interpolation.

Herein, it is shown for the sake of illustrative purpose that a 3×3 green plane is obtained through the green interpolation using the window having a 3×3 bayer pattern.

Referring to FIG. 5(a), each location of (1,1), (1,3), (2,2), (3,1), and (3,3) has green information, whereas the other locations do not have the green information. Thus, the green interpolation is performed over the locations having no green information using a following mathematic equation 2.

$$G12 = (G11 + G22 + G13)/3$$

$$G21 = (G11 + G22 + G31)/3$$

$$G23 = (G13 + G22 + G33)/3$$

$$G32 = (G22 + G31 + G33)/3 \quad [\text{Eq. 2}]$$

That is, the pixel having no green information, e.g., G11, G21, G23, and G32, has a mean value of the green values of nearest-neighboring pixels having the green information.

The bayer data may undergo a bad pixel cancellation process. However, unless the bayer data undergoes the bad pixel cancellation process, the focus data is generated by using an edge detection filter (S304) in case that there is no bad pixel therein, after determining as to whether there is any bad pixel or not in order to reduce an effect of the focus data due to the bad pixel (S303).

As a determination result, if there exists the bad pixel, the green interpolation is performed again (S302) after performing a bad pixel compensation (S305).

The bad pixel determination and the bad pixel compensation will be represented with reference to a following mathematic equation 3.

$$G22 = (G11 + G13 + G31 + G33)/4 \quad [\text{Eq. 3}]$$

In detail, if the G22 pixel satisfies a following inequality conditions, i.e., |G22−G21|>Th (threshold value), |G22−G13|>Th, |G22−G31|>Th and |G22−G33|>Th, the G22 pixel proves to be a bad pixel so that the bad pixel compensation is performed, whereby the G22 pixel have the green information as represented as the above equation 3. On the contrary, if the G22 pixel does not satisfy the above inequality conditions, it is not the bad pixel so that the bad pixel compensation is not performed.

That is, if all the absolute values of differences between the corresponding pixel G22 and the other pixels G11, G13, G31 and G33 having the green information are greater than the predetermined threshold value Th, the corresponding pixel G22 is regarded as a bad pixel. Otherwise, the corresponding pixel G22 is not regarded as the bad pixel. In addition, if the corresponding pixel G22 proves to be the bad pixel, the corresponding pixel G22 is interpolated to have the means value of the green values of the pixels G11, G13, G31 and G33 of which one has its green information.

After completing the green interpolation, the bad pixel determination and the bad pixel compensation through the above processes, the focus data is generated. A procedure for generating the focus data will be more illustrated in detail herebelow.

In order to generate the focus data, energy or a boundary value of the high frequency component should be generated. The energy of the high frequency component may enable the focus data to be generated by taking only image information of a high frequency region after transforming the image information of a spatial domain into that of a frequency domain through M×N Fourier transform or discrete cosine transform.

Since frequency transformation of the M×N block has a decisive effect on enlarging an area of a hardware because there is a need for a line memory or the like for frequency transformation, it is possible to apply the M×N edge detection filter for generating the focus data instead of this process in order to prevent the area of the hardware from being enlarged.

Figure 6:
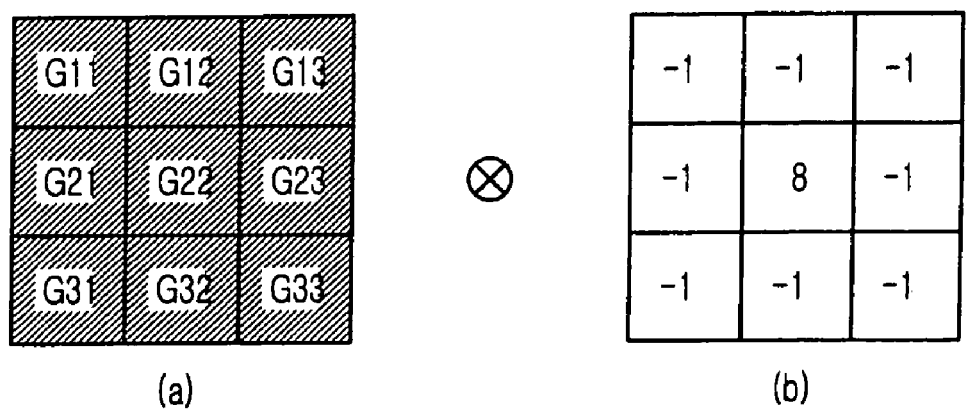
FIG. 6 is a drawing setting forth a convolution of a green plane and a Laplacian mask for generating a boundary value.

FIG. 6 is a drawing setting forth a convolution of the green plane and a Laplacian mask for generating a boundary value.

The boundary value of each pixel is a summation value of them after being multiplied by coefficients of a M×N edge detection filter such as Sobel or Laplacian mask. In this manner, the boundary value of each pixel which belongs to the focus region is successively accumulated to obtain the focus value.

A result of a following equation 4 will be obtained through the convolution of the green plane and the Laplacian mask of FIG. 6.

$$E = 8 \times G22 - (G11 + G12 + G13 + G21 + G23 + G31 + G32 + G33) \quad [\text{Eq. 4}]$$

Through the above processes, it is possible to generate the focus value by adding all the boundary values of the pixels or all the high frequency energies of respective blocks which belong to the region to be computed.

As stated above, the present invention provides the method for generating the focus data for the auto focus control in the system in which the image sensor having RGB bayer pattern is mounted. In accordance with the present invention, without the R/B interpolation and the color space conversion processes, which are essentially needed for generating the focus in the prior art, it is possible to generate the focus data accurately, which results in reducing the area of the hardware and power consumption.

While the present invention has been described with respect to certain preferred embodiments, it will be apparent to those skilled in the art that various changes and modifications may be made without departing from the spirit and scope of the invention as defined in the following claims.

What is claimed is:

1. An apparatus comprising:
   a green interpolation unit configured to:
     receive an RGB bayer pattern from an image sensor;
     interpolate the RGB bayer pattern by replacing a value of an originally red or blue pixel with an average value of a first number of originally green pixels to form an original M×N green plane;

determine a bad pixel if an evaluation pixel in the original M×N green plane satisfies an inequality condition;

compensate the bad pixel to form a compensated M×N green plane by replacing the bad pixel value with an average of a second number of originally green pixels in the original M×N green plane; and interpolate the compensated M×N green plane by replacing a value of an originally red or blue pixel with an average value of a third number of originally green pixels in the compensated M×N green plane to form a final green plane; and a focus data generation unit configured to extract focus data from the final green plane, wherein the first number is at least three, the second number is at least four, and the third number is at least three, and wherein the first number is not equal to the second number and the first number is equal to the third number.

2. The apparatus of claim 1, wherein the inequality condition comprises:

a computation of four absolute value differences between the evaluation pixel value and the four originally green pixels in the original M×N plane; and a comparison of a threshold value against four absolute value differences.

3. A method for generating focus data from an image sensor, the method comprising:

receiving an RGB bayer pattern from the image sensor;

interpolating the RGB bayer pattern by replacing a value of an originally red or blue pixel with an average value of a first number of originally green pixels to form an original M×N green plane;

determining a bad pixel if an evaluation pixel in the original M×N green plane satisfies an inequality condition;

compensating the bad pixel to form a compensated M×N green plane by replacing the bad pixel value with an average value of a second number of originally green pixels in the original M×N green plane;

interpolating the compensated M×N green plane by replacing a value of an originally red or blue pixel with an average value of a third number of originally green pixels in the compensated M×N green plane to form a final green plane; and extracting the focus data by determining a high frequency energy of the final green plane, wherein the first number is at least three, the second number is at least four, and the third number is at least three, and wherein the first number is not equal to the second number and the first number is equal to the third number.

4. The method of claim 3, wherein the inequality condition comprises:

a computation of four absolute value differences between the evaluation pixel value and the four originally green pixels in the original M×N plane; and a comparison of a threshold value against four absolute value differences.

5. The method of claim 3, wherein said extracting the focus data comprises convolving the final green plane with an edge detection filter.

6. The method of claim 5, wherein said extracting the focus data further comprises adding boundary values of pixels in the final green plane.

7. The apparatus of claim 1, wherein the focus data generation unit is further configured to convolve the final green plane with an edge detection filter to extract the focus data.

8. The apparatus of claim 7, wherein the focus data generation is further configured to add boundary values of pixels in the final green plane to extract the focus data.

9. The apparatus of claim 7, wherein the focus data generation is further configured to convolve the final green plane in a spatial domain with the edge detection filter.

10. The method of claim 3, wherein said extracting the focus data further comprises performing a convolution of the final green plane with an edge detection filter.

11. The method of claim 10, wherein said extracting the focus data further comprises adding boundary values of pixels in the final green plane.

12. The method of claim 10, wherein said extracting the focus data further comprises performing a convolution of the final green plane in a spatial domain with the edge detection filter.

* * * * *